United States Patent
Paulraj et al.

(10) Patent No.: US 12,118,363 B2
(45) Date of Patent: Oct. 15, 2024

(54) COORDINATED BOOT SYNCHRONIZATION AND STARTUP OF INFORMATION HANDLING SYSTEM SUBSYSTEMS

(71) Applicant: Dell Products L.P., Round Rock, TX (US)

(72) Inventors: Deepaganesh Paulraj, Bangalore (IN); Akkiah Choudary Maddukuri, Austin, TX (US); Lee E. Ballard, Georgetown, TX (US); Sai Bale, Bangalore (IN); Anusha Ghali, Belgaum (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/714,824

(22) Filed: Apr. 6, 2022

(65) Prior Publication Data
US 2023/0325198 A1    Oct. 12, 2023

(51) Int. Cl.
*G06F 9/4401*    (2018.01)
(52) U.S. Cl.
CPC .................................. *G06F 9/4401* (2013.01)
(58) Field of Classification Search
None
See application file for complete search history.

(56) References Cited

U.S. PATENT DOCUMENTS

| | | | |
|---|---|---|---|
| 2003/0051062 A1* | 3/2003 | Circenis | G06F 9/542 719/310 |
| 2011/0145558 A1* | 6/2011 | Khosravi | G06F 9/4416 710/107 |
| 2018/0314318 A1* | 11/2018 | Remis | G06F 1/26 |
| 2019/0042741 A1* | 2/2019 | Abodunrin | G06F 13/4068 |

\* cited by examiner

*Primary Examiner* — Paul Yen
(74) *Attorney, Agent, or Firm* — Jackson Walker L.L.P.

(57) ABSTRACT

An information handling system may include a processor, a subsystem communicatively coupled to the processor, and a management controller communicatively coupled to the processor and the subsystem and configured for out-of-band management of the information handling system, the management controller further configured to, in response to an alternating current power cycle of the information handling system: cause a basic input/output system of the information handling system to pause its boot process prior to enumeration of functions of the subsystem; and upon completion of the boot process of the subsystem and initialization of virtual functions of the subsystem, cause the basic input/output system to unpause the boot process in order to enumerate the functions of the subsystem including the virtual functions.

12 Claims, 4 Drawing Sheets

COORDINATED BOOT SYNCHRONIZATION AND STARTUP OF INFORMATION HANDLING SYSTEM SUBSYSTEMS

TECHNICAL FIELD

The present disclosure relates in general to information handling systems, and more particularly to methods and systems for coordinated boot synchronization and startup of information handling system subsystems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using data processing units or DPUs. A DPU may be thought of as a "system within a system" or "computer within a computer," in that a DPU may comprise a specialized card with its own processor, local storage, and operating system stored on such local storage. One example of a DPU is a smart network interface card or "smartNIC" that may offer capabilities not found in traditional network interface cards (NICs). In addition to the stateful and custom offloads a smartNIC may provide, it may have an independent management domain with a separate operating system, independent credentials, and independent remote access.

During alternating current (AC) power on of an information handling system, both a basic/input output system (BIOS) and a DPU may boot together, at the same time. When BIOS enumerates functions (e.g., Peripheral Component Interconnect (PCI) functions) during early power-on/self-test, the DPU may not have completed loading of any of its virtualized/emulated additional PCI functions. Accordingly, BIOS execution may proceed past the PCI enumeration stage before loading of these virtualized/emulated additional PCI functions, and thus, may not enumerate these additional PCI functions.

SUMMARY

In accordance with the teachings of the present disclosure, the disadvantages and problems associated with existing approaches to booting component subsystems of an information handling system may be reduced or eliminated.

In accordance with embodiments of the present disclosure, an information handling system may include a processor, a subsystem communicatively coupled to the processor, and a management controller communicatively coupled to the processor and the subsystem and configured for out-of-band management of the information handling system, the management controller further configured to, in response to an alternating current power cycle of the information handling system: cause a basic input/output system of the information handling system to pause its boot process prior to enumeration of functions of the subsystem; and upon completion of the boot process of the subsystem and initialization of virtual functions of the subsystem, cause the basic input/output system to unpause the boot process in order to enumerate the functions of the subsystem including the virtual functions.

In accordance with these and other embodiments of the present disclosure, a method may be provided for use in an information handling system comprising a processor and a subsystem communicatively coupled to the processor, and a management controller communicatively coupled to the processor and the subsystem and configured for out-of-band management of the information handling system. The method may include, in response to an alternating current power cycle of the information handling system: causing, by the management controller, a basic input/output system of the information handling system to pause its boot process prior to enumeration of functions of the subsystem; and upon completion of the boot process of the subsystem and initialization of virtual functions of the subsystem, causing the basic input/output system to unpause the boot process in order to enumerate the functions of the subsystem including the virtual functions.

In accordance with these and other embodiments of the present disclosure, an article of manufacture may include a non-transitory computer-readable medium and computer-executable instructions carried on the computer-readable medium, the instructions readable by a management controller of an information handling system comprising a processor and a subsystem communicatively coupled to the processor, and the management controller communicatively coupled to the processor and the subsystem and configured for out-of-band management of the information handling system. The instructions, when read and executed, may cause the management controller to, in response to an alternating current power cycle of the information handling system cause a basic input/output system of the information handling system to pause its boot process prior to enumeration of functions of the subsystem; and upon completion of the boot process of the subsystem and initialization of virtual functions of the subsystem, cause the basic input/output system to unpause the boot process in order to enumerate the functions of the subsystem including the virtual functions.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
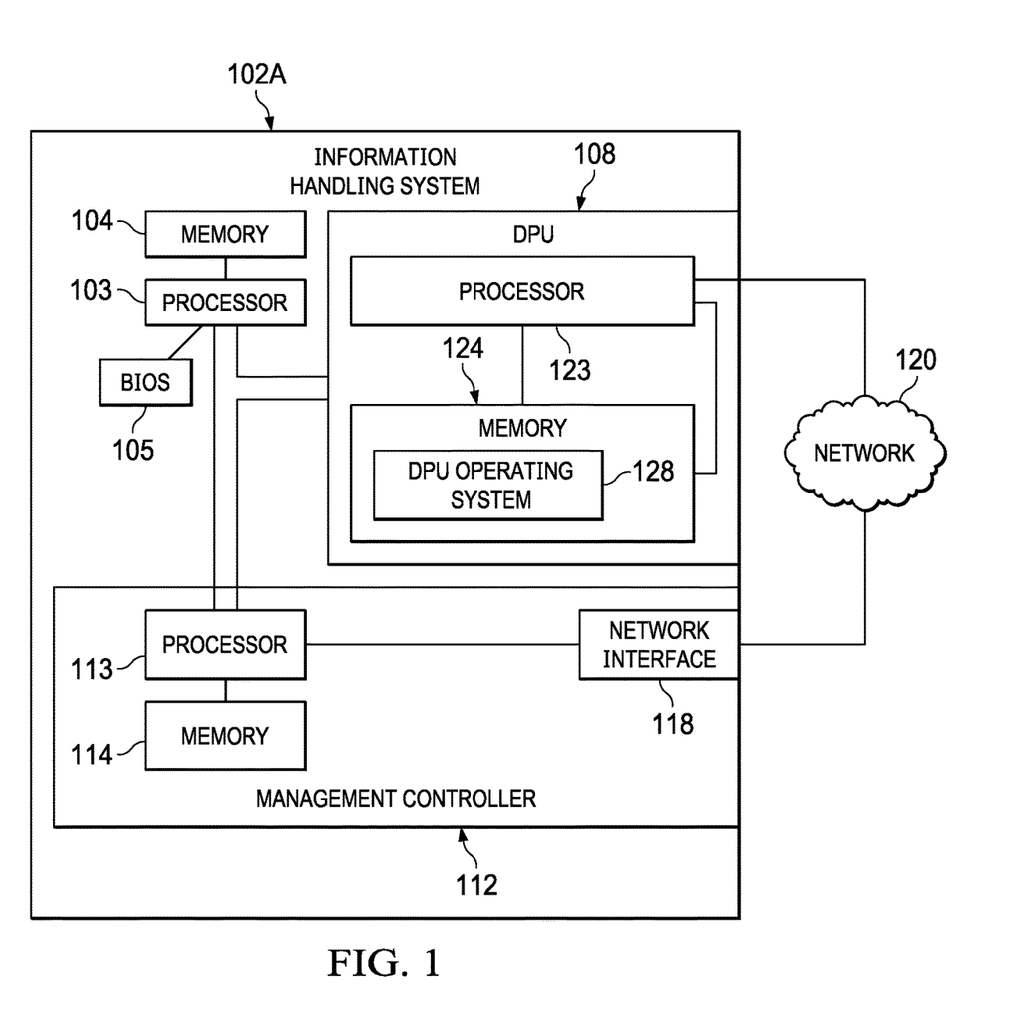
FIG. 1 illustrates a block diagram of an example information handling system, in accordance with embodiments of the present disclosure.

FIG. 1 illustrates a block diagram of an example information handling system 102A, in accordance with embodiments of the present disclosure. In some embodiments, information handling system 102A may comprise or be an integral part of a server. In other embodiments, information handling system 102A may be a personal computer. In these and other embodiments, information handling system 102A may be a portable information handling system (e.g., a laptop, notebook, tablet, handheld, smart phone, personal digital assistant, etc.). As depicted in FIG. 1, information handling system 102A may include a processor 103, a memory 104 communicatively coupled to processor 103, a basic input/output system (BIOS) 105 communicatively coupled to processor 103, a DPU 108 communicatively coupled to processor 103, and a management controller 112 communicatively coupled to processor 103 and DPU 108.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102A.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102A is turned off.

BIOS 105 may be communicatively coupled to processor 103 and may include any system, device, or apparatus configured to identify, test, and/or initialize information handling resources of information handling system 102A. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102A is booted and/or powered on. As part of its initialization functionality, code for BIOS 105 may be configured to set components of information handling system 102A into a known state, so that one or more applications (e.g., an operating system or other application programs) stored on compatible media (e.g., memory 104) may be executed by processor 103 and given control of information handling system 102A.

DPU 108 may comprise any suitable system, apparatus, or device that comprises a specialized card or other peripheral with its own processor, local storage, and operating system stored on such local storage, and may in essence function itself as an information handling system. DPU 108 may be communicatively coupled to processor 103 via any suitable protocol or standard, including without limitation Peripheral Component Interconnect Express (PCIe), Universal Serial Bus (USB), and/or a serial connection. In some embodiments, DPU 108 may also be known as a smartNIC, functional accelerator card (FAC), functional off-load coprocessor (FOCP), infrastructure processing unit (IPU), or distributed services card (DSC). As shown in FIG. 1, DPU 108 may comprise a processor 123 and memory 124.

Processor 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124 and/or another component of DPU 108.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to DPU 108 is turned off. As shown in FIG. 1, memory 124 may have stored thereon DPU operating system 128.

DPU operating system 128 may comprise any program of executable instructions, or aggregation of programs of executable instructions, configured to, when executed by processor 123, manage and/or control the allocation and usage of hardware resources of DPU 108 such as memory, processor time, disk space, and input and output devices, and provide an interface between such hardware resources and application programs hosted by DPU operating system 128.

Management controller 112 may be configured to provide out-of-band management facilities for management of information handling system 102A. Such management may be made by management controller 112 even if information handling system 102A is powered off or powered to a standby state. Management controller 112 may include a processor 113, memory 114, and an out-of-band network interface 118 separate from and physically isolated from an in-band network interface (e.g., DPU 108). In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102A or management controller 112.

Processor 113 may be communicatively coupled to processor 103 via any suitable protocol or standard, including without limitation Peripheral Component Interconnect Express (PCIe), Universal Serial Bus (USB), Keyboard Controller Style (KCS) interface, and/or a serial connection. Processor 113 may be communicatively coupled to DPU 108 via any suitable protocol or standard, including without limitation Universal Serial Bus (USB), reduced media-independent interface-based transport (RBT), and/or a serial connection.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

In operation, management controller 112 may be configured to coordinate boot synchronization between boot of BIOS 105 and boot of DPU 108, as described in greater detail below.

In addition to processor 103, memory 104, BIOS 105, DPU 108, and management controller 112, information handling system 102A may include one or more other information handling resources.

Network 120 may comprise a network and/or fabric configured to couple information handling system 102A to one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Although network 120 is shown as being external in FIG. 1, in some embodiments, network 120 may be internal and in some of such embodiments, may implement the communication interface between DPU 108 and processor 113.

Figure 2:
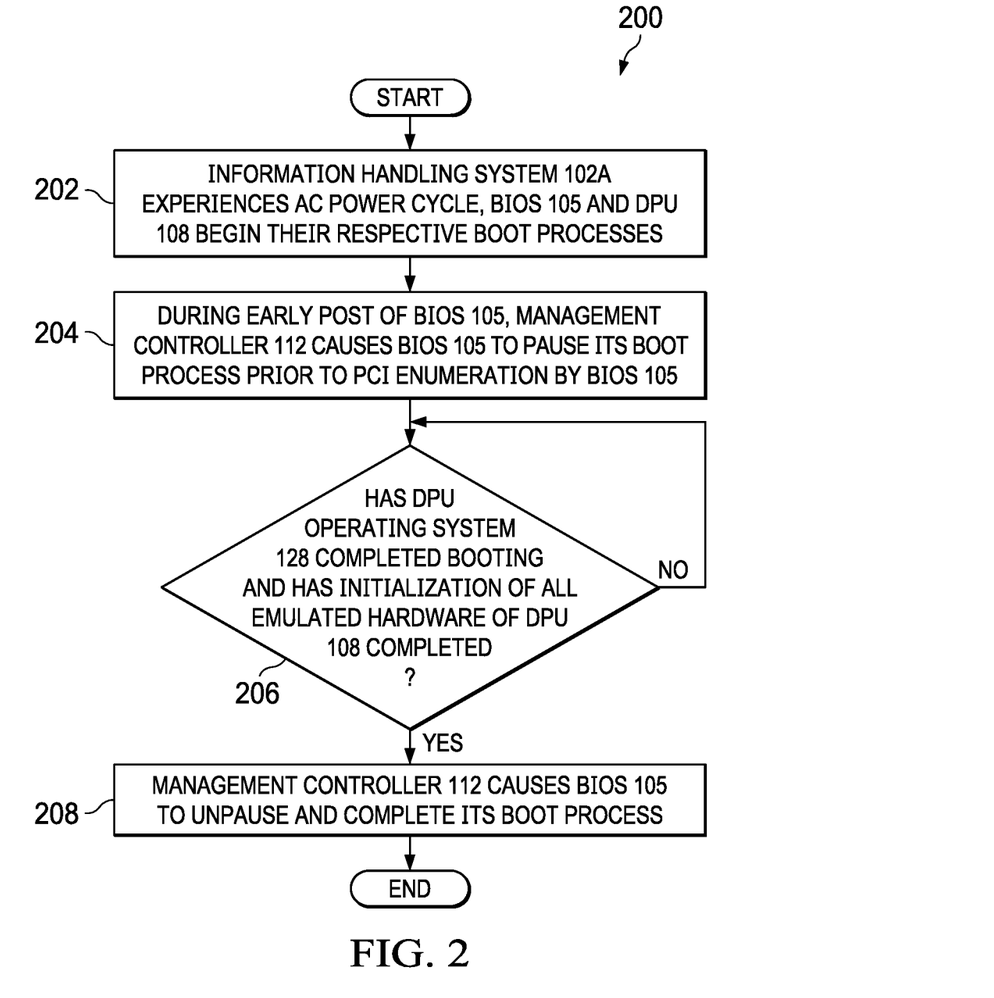
FIG. 2 illustrates a flow chart of an example method for coordinated boot synchronization and startup of information handling system subsystems, in accordance with embodiments of the present disclosure.

FIG. 2 illustrates a flow chart of an example method 200 for coordinated boot synchronization and startup of subsystems of information handling system 102A, in accordance with embodiments of the present disclosure. According to some embodiments, method 200 may begin at step 202. As noted above, teachings of the present disclosure may be implemented in a variety of configurations of information handling system 102A. As such, the preferred initialization point for method 200 and the order of the steps comprising method 200 may depend on the implementation chosen.

At step 202, information handling system 102A may experience an AC power cycle, and BIOS 105 and DPU 108 may both begin their respective boot processes. At step 204, during early power-on/self-test (POST) of BIOS 105, management controller 112 may instruct or otherwise cause BIOS 105 to pause its boot process prior to PCI enumeration by BIOS 105. At step 206, management controller 112 may determine if DPU operating system 128 has completed booting and initialization of all emulated hardware of DPU 108 have completed. For example, in some embodiments, management controller 112 may receive Intelligent Management Platform Interface (IPMI) commands from BIOS 105 to determine boot status of DPU operating system 128 and virtualization status of DPU 108, and communicate messages to DPU 108 to request such status information. If DPU operating system 128 has completed booting and initialization of all PCI functions of DPU 108 have completed, method 200 may proceed to step 208. Otherwise, method 200 may remain at step 206 until DPU operating system 128 has completed booting and initialization of all PCI functions of DPU 108 have completed.

At step 208, management controller 112 may instruct or otherwise cause BIOS 105 to unpause and complete its boot process, thus allowing BIOS 105 to enumerate all regular and virtualized PCI functions of DPU 108. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102A or any other system operable to implement method 200. In certain embodiments, method 200 may be implemented partially or fully in software and/or firmware embodied in computer-readable media.

Figure 3:
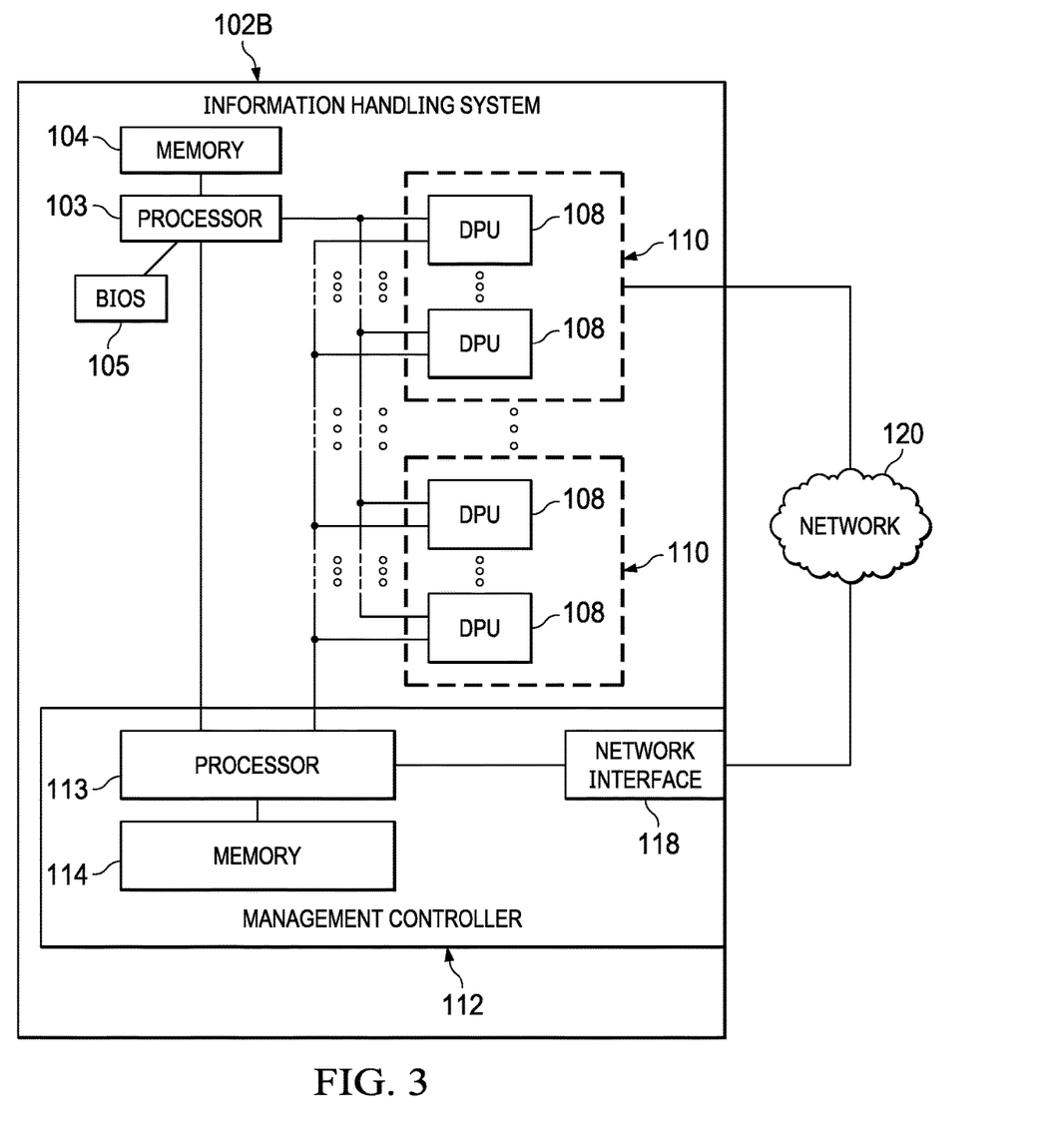
FIG. 3 illustrates a block diagram of another example information handling system, in accordance with embodiments of the present disclosure.

FIG. 3 illustrates a block diagram of an example information handling system 102B, in accordance with embodiments of the present disclosure. In many respects, information handling system 102B of FIG. 3 may be similar to information handling system 102A of FIG. 1, except that information handling system 102B may include a plurality of DPUs 108, intelligently grouped by management controller 112 into groups 110 based on capabilities of the plurality of DPUs 108 (e.g., DPUs 108 with similar capabilities may be grouped within the same group 110).

Figure 4:
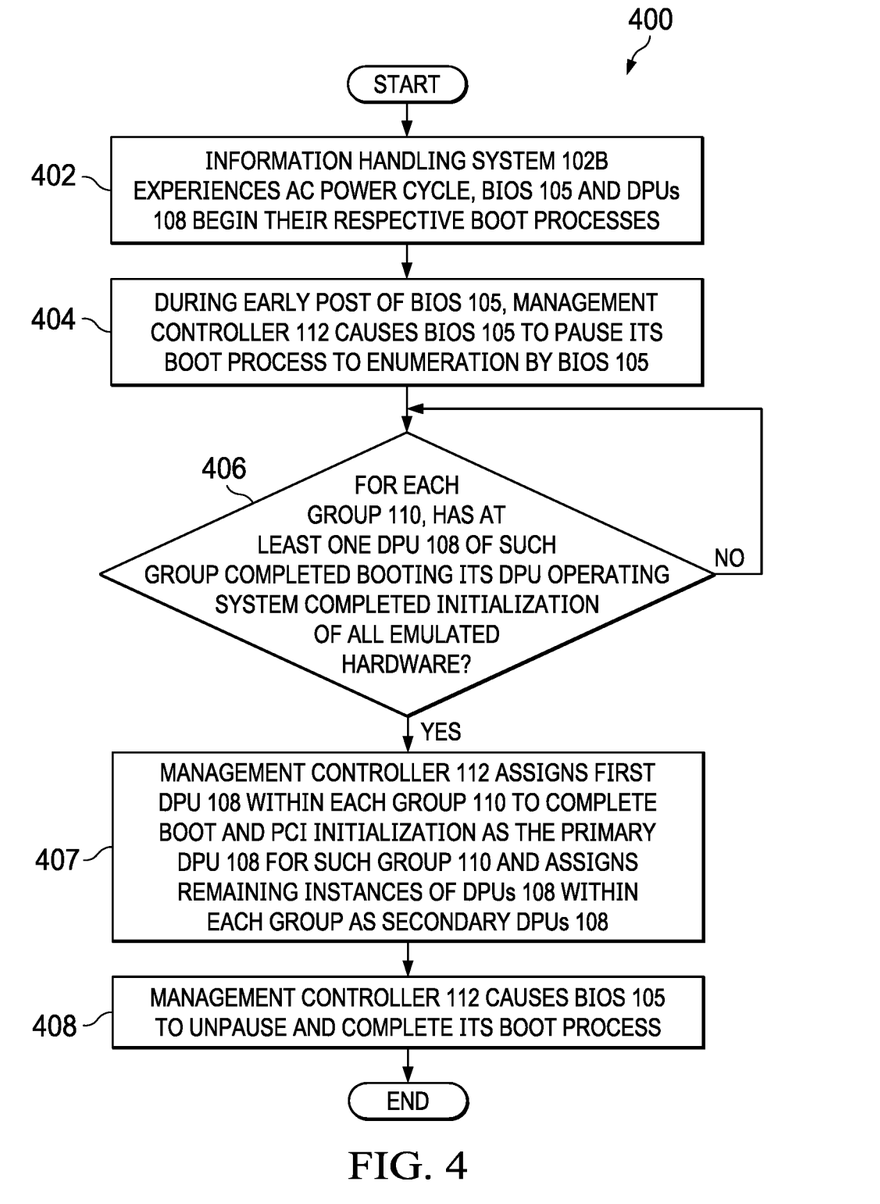
FIG. 4 illustrates a flow chart of an example method for coordinated boot synchronization and startup of information handling system subsystems for an information handling system having multiple DPUs, in accordance with embodiments of the present disclosure.

FIG. 4 illustrates a flow chart of an example method 400 for coordinated boot synchronization and startup of subsystems of information handling system 102B, in accordance with embodiments of the present disclosure. According to some embodiments, method 400 may begin at step 402. As noted above, teachings of the present disclosure may be implemented in a variety of configurations of information handling system 102B. As such, the preferred initialization point for method 400 and the order of the steps comprising method 400 may depend on the implementation chosen.

At step 402, information handling system 102B may experience an AC power cycle, and BIOS 105 and DPUs 108 may both begin their respective boot processes. At step 404, during early POST of BIOS 105, management controller 112 may instruct or otherwise cause BIOS 105 to pause its boot process prior to PCI enumeration by BIOS 105. At step 406, management controller 112 may determine, for each group 110, if a DPU operating system 128 within such group 110 has completed booting and initialization of all PCI functions of a DPU 108 within such group 110 have completed. If each group has at least one DPU 108 for which its DPU operating system 128 has completed booting and initialization of all PCI functions of the at least one DPU 108 have completed, method 400 may proceed to step 407. Otherwise, method 400 may remain at step 406 until DPU operating system 128 has completed booting and initialization of all PCI functions of DPU 108 have completed.

At step 407, management controller 112 may assign the first DPU 108 within each group 110 to complete boot and PCI initialization as the primary DPU 108 for such group 110 and assign the remaining instances of DPUs 108 within each group as secondary DPUs 108.

At step 408, management controller 112 may instruct or otherwise cause BIOS 105 to unpause and complete its boot process, thus allowing BIOS 105 to enumerate all regular and virtualized PCI functions of each group 110 (e.g., which may allow a host operating system executing on processor 103 to boot from a primary DPU 108 of a group 110, rather than waiting for all DPUs 108 to complete boot and PCI virtualization). After completion of step 408, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102B or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
a basic input/output system (BIOS);
a plurality of subsystems including a first subsystem communicatively coupled to the processor; and
a management controller communicatively coupled to the processor and the first subsystem and configured for out-of-band management of the information handling system, the management controller further configured to:
group each subsystem of the plurality of subsystems into one of one or more groups based on capabilities of the plurality of subsystems;
detect an alternating power cycle of the information handling system, wherein a boot process of the BIOS and a boot process of the first subsystem both begin in response to the alternating power cycle;
instruct, responsive to detecting the alternating power cycle, the BIOS to pause its boot process prior to enumeration of Peripheral Components Interconnect (PCI) functions of the plurality of subsystems until at least one subsystem in each of the one or more groups has completely booted and initialized its PCI functions, wherein the at least one subsystem comprises a subsystem with one or more virtual PCI functions; and
upon detecting completion of the boot process and initialization of PCI functions of at least one subsystem of each of the one or more groups, instruct the BIOS to unpause its boot process.

2. The information handling system of claim 1, wherein the first subsystem comprises a data processing unit.

3. The information handling system of claim 1, wherein the first subsystem comprises a smart network interface card.

4. The information handling system of claim 1, wherein the PCI functions of the first subsystem include one or more virtual functions.

5. A method, of a management controller in an information handling system comprising a processor, a basic input/output system (BIOS), and a plurality of subsystems including a first subsystem communicatively coupled to the processor, wherein the management controller is communicatively coupled to the processor and the first subsystem and configured for out-of-band management of the information handling system, the method comprising:
grouping each subsystem of the plurality of subsystems into one of one or more groups based on capabilities of the plurality of subsystems;
detecting an alternating power cycle of the information handling system, wherein a boot process of the BIOS and a boot process of the first subsystem both begin in response to the alternating power cycle;
instructing, responsive to detecting the alternating power cycle, the BIOS of the information handling system to pause its boot process prior to Peripheral Components Interconnect (PCI) enumeration of functions of the plurality of subsystems until at least one subsystem in each of the one or more groups has completely booted and initialized its PCI functions, wherein the at least one subsystem comprises a subsystem with one or more virtual PCI functions; and
upon detecting completion of the boot process and initialization of PCI functions of at least one subsystem of each of the one or more groups, instructing the BIOS to unpause its boot process.

6. The method of claim 5, wherein the first subsystem comprises a data processing unit.

7. The method of claim 5, wherein the first subsystem comprises a smart network interface card.

8. The method of claim 5, wherein the PCI functions of the first subsystem include one or more virtual functions.

9. An article of manufacture comprising:
a non-transitory computer-readable medium; and
computer-executable instructions carried on the computer-readable medium, the instructions readable by a management controller of an information handling system comprising a processor, a basic input/output system (BIOS), and a plurality of subsystems including a first subsystem communicatively coupled to the processor, and the management controller communicatively coupled to the processor and the first subsystem and configured for out-of-band management of the information handling system, the instructions, when read and executed, for causing the management controller to:
group each subsystem of the plurality of subsystems into one of one or more groups based on capabilities of the plurality of subsystems;
detect an alternating power cycle of the information handling system, wherein a boot process of the BIOS and a boot process of the first subsystem both begin in response to the alternating power cycle;

instruct, responsive to detecting the alternating power cycle, the BIOS to pause its boot process prior to enumeration of Peripheral Components Interconnect (PCI) functions of the plurality of subsystems until at least one subsystem in each of the one or more groups has completely booted and initialized its PCI functions, wherein the at least one subsystem comprises a subsystem with one or more virtual PCI functions; and upon detecting completion of the boot process and initialization of PCI functions of at least one subsystem of each of the one or more groups, instruct the BIOS to unpause its boot process.

10. The article of claim 9, wherein the first subsystem comprises a data processing unit.

11. The article of claim 9, wherein the first subsystem comprises a smart network interface card.

12. The article of claim 9, wherein the PCI functions of the first subsystem include one or more virtual functions.

* * * * *